(12) United States Patent
Das et al.

(10) Patent No.: US 10,384,680 B2
(45) Date of Patent: Aug. 20, 2019

(54) METHOD AND SYSTEM FOR MOTOR VEHICLE LONGITUDINAL CONTROL

(71) Applicant: Ford Global Technologies, LLC, Dearborn, MI (US)

(72) Inventors: Ashrit Das, Cologne (DE); Marie Preusser, Cologne Nordrhein-Westfalen (DE); Thomas Svensson, Leichlingen (DE)

(73) Assignee: Ford Global Technologies, LLC., Dearborn, MI (US)

( * ) Notice: Subject to any disclaimer, the term of this patent is extended or adjusted under 35 U.S.C. 154(b) by 53 days.

(21) Appl. No.: 15/460,179

(22) Filed: Mar. 15, 2017

(65) Prior Publication Data

US 2017/0267236 A1  Sep. 21, 2017

(30) Foreign Application Priority Data

Mar. 16, 2016  (DE) .................. 10 2016 204 356

(51) Int. Cl.
*B60W 30/14* (2006.01)
*B60W 10/18* (2012.01)
*B60W 30/18* (2012.01)
*B60W 10/04* (2006.01)

(52) U.S. Cl.
CPC .......... *B60W 30/143* (2013.01); *B60W 10/04* (2013.01); *B60W 10/18* (2013.01); *B60W 30/18063* (2013.01); *B60W 2510/18* (2013.01); *B60W 2520/10* (2013.01); *B60W 2720/10* (2013.01)

(58) Field of Classification Search
CPC .. G05D 1/0223; B60W 30/14; B60W 30/143; B60W 30/146; B60W 30/16; B60W 30/162; B60W 30/18063; B60W 30/18109; B60W 30/18118; B60W 30/18127; B60W 30/18136; B60W 10/18; B60W 10/184; B60W 10/188; B60W 10/196; B60W 10/198; B60W 2510/18; B60W 10/04; B60W 10/06; B60W 10/08; B60W 30/18054; B60T 7/00; B60T 7/12
See application file for complete search history.

(56) References Cited

U.S. PATENT DOCUMENTS 6,278,931 B1 * 8/2001 Crawford ............. B60K 31/047
                                                180/170
8,280,612 B2 * 10/2012 Whitney ............... F02D 11/105
                                                123/299
9,139,172 B2   9/2015 Bach et al.
(Continued)

FOREIGN PATENT DOCUMENTS

DE   19806116 A1   8/1999
DE   102012212090 A1   1/2014

*Primary Examiner* — Thomas G Black
*Assistant Examiner* — Sara J Lewandroski
(74) *Attorney, Agent, or Firm* — Raymond L. Coppiellie; Burgess Law Office, PLLC

(57) ABSTRACT

The invention relates to a method for longitudinal control of a motor vehicle, the motor vehicle having an engine and a braking system. The method including receiving a torque demand from a controller for controlling the speed of the vehicle, and providing a torque on the basis of this torque demand, whereby, depending on the value of the torque demand, a brake torque counteracts the torque demand to control longitudinal vehicle movement.

10 Claims, 7 Drawing Sheets

(56) References Cited

U.S. PATENT DOCUMENTS

| | | | |
|---|---|---|---|
| 9,205,838 B2 | 12/2015 | Moore et al. | |
| 2002/0023789 A1* | 2/2002 | Morisawa | B60K 6/48 |
| | | | 180/65.25 |
| 2003/0029657 A1* | 2/2003 | Darnell | B60T 8/00 |
| | | | 180/170 |
| 2003/0097215 A1* | 5/2003 | Riedle | F02D 11/105 |
| | | | 701/110 |
| 2012/0271523 A1* | 10/2012 | Sardari Iravani | B60T 7/122 |
| | | | 701/70 |
| 2013/0066493 A1* | 3/2013 | Martin | B60W 20/00 |
| | | | 701/22 |
| 2013/0311055 A1* | 11/2013 | Whitney | B60W 30/18027 |
| | | | 701/54 |
| 2015/0274148 A1* | 10/2015 | Nefcy | B60W 10/30 |
| | | | 477/4 |
| 2016/0023659 A1* | 1/2016 | Tanaka | B60W 30/17 |
| | | | 701/22 |
| 2017/0096140 A1* | 4/2017 | Woodley | B60W 50/10 |
| 2018/0126987 A1* | 5/2018 | Burford | B60W 30/143 |
| 2018/0126994 A1* | 5/2018 | Chang | G01S 15/931 |
| 2018/0222459 A1* | 8/2018 | Kelly | B60W 10/06 |

* cited by examiner

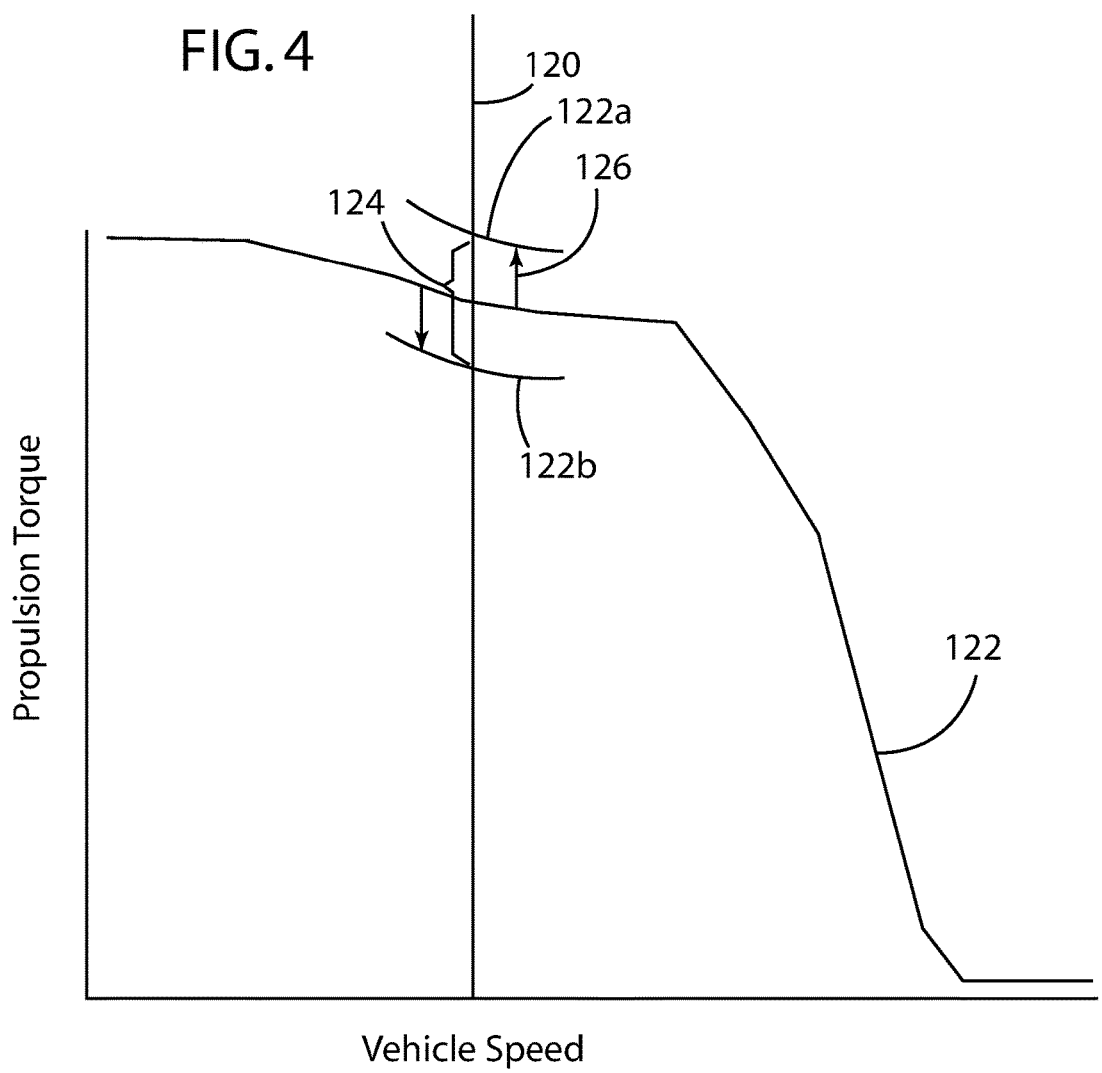

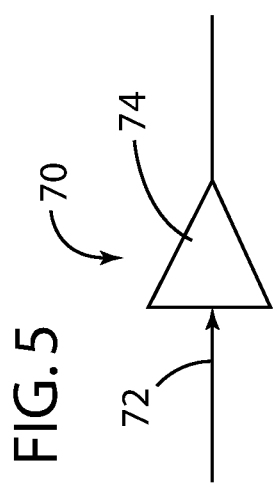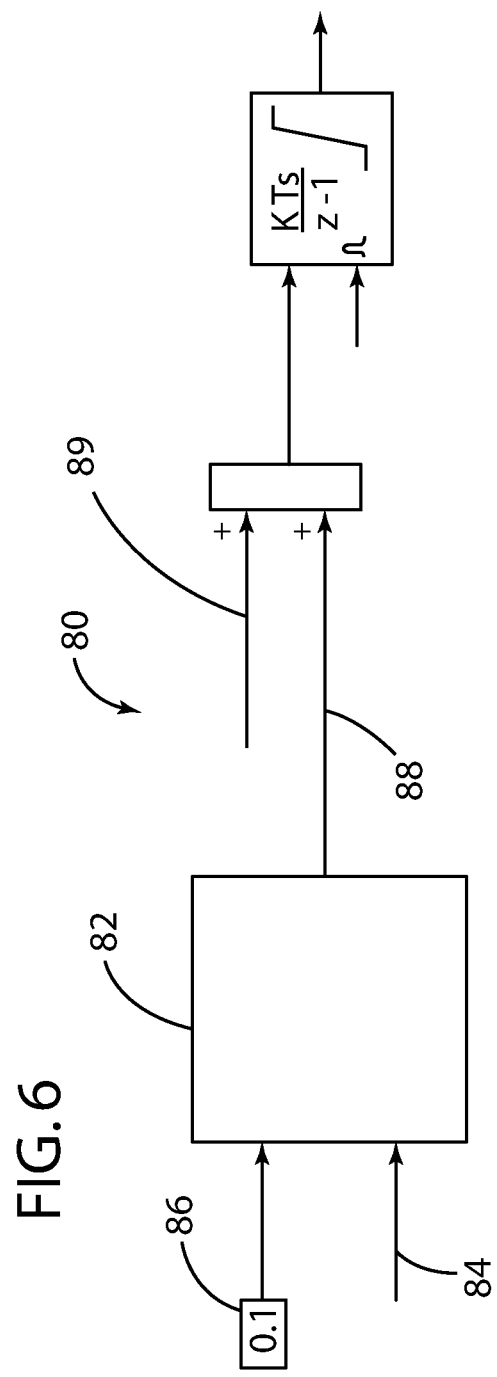

METHOD AND SYSTEM FOR MOTOR VEHICLE LONGITUDINAL CONTROL

CROSS-REFERENCE TO RELATED APPLICATIONS

Not Applicable.

BACKGROUND OF THE INVENTION

1. Field of the Invention

The invention relates to a method and system for motor vehicle longitudinal control, and more particularly longitudinal control at low speed.

2. Description of Related Art

Driving-assistance systems, such as an automatic spacing-control system with a stop & go function, operate to control longitudinal movement of motor vehicles. Providing smooth operation and ride quality at low vehicle speeds requires controlling longitudinal vehicle movement in a gentle and jerk-free manner, since sensitivity to jerks, short abrupt motions or frequent jolts caused by rapid changes of acceleration, increases at low vehicle speed.

Controlling longitudinal vehicle movement represents a challenge, insofar as longitudinal velocity control, including set point control, is difficult to realize solely with the aid of conventional braking system since making fine or more exact torque control is necessary. In operation, a conventional braking system exhibits step-like changes in pressure causing jerks or as set forth above, short abrupt motions or frequent jolts, affecting vehicle ride and handling. It is essential that changes in brake pressure occur as gently or gradually as possible to maintain gentle and smooth longitudinal control when using the braking system. Often such smooth and gentle changes are not possible due to existing design defaults with conventional braking systems. Whereby, in practice, as a rule, jerk-free longitudinal control at low speeds using conventional braking systems is not attainable.

Using the engine for a finer or more accurate control in the conventional method for determining torque requirement, in which the engine torque is calculated and is multiplied by the transfer function of subsequent components in the drive train, is inaccurate. Finer torque control requires a more direct and robust computational method to calculate the propulsion torque. Moreover, incorrect control of the engine, and correspondingly torque, results in low-frequency oscillations during the control action in engine speed, which may be audible and troublesome for the driver as well as any other occupants of the vehicle.

SUMMARY OF THE INVENTION

A method for longitudinal control of a motor vehicle including determining a drive torque based on a set vehicle speed and actual vehicle speed and calculating an engine speed from said drive torque. The method uses an engine idle speed, in case the engine speed calculated is lower than the idle speed, to determine a propulsion torque and then compares the propulsion torque with the required drive torque. Wherein application of a brake torque compensates for the difference between the required drive torque and the calculated propulsion torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a schematic representation of propulsion torque for a given engine idle speed and vehicle velocity wherein the engine speed and consequently the propulsion torque can be varied to compensate for decreased modulation of the brake system.

FIG. 5 is a schematic representation of a P-component of a PID controller according to an exemplary embodiment of the present invention.

FIG. 6 is a schematic representation of an I-component of a PID controller according to an exemplary embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
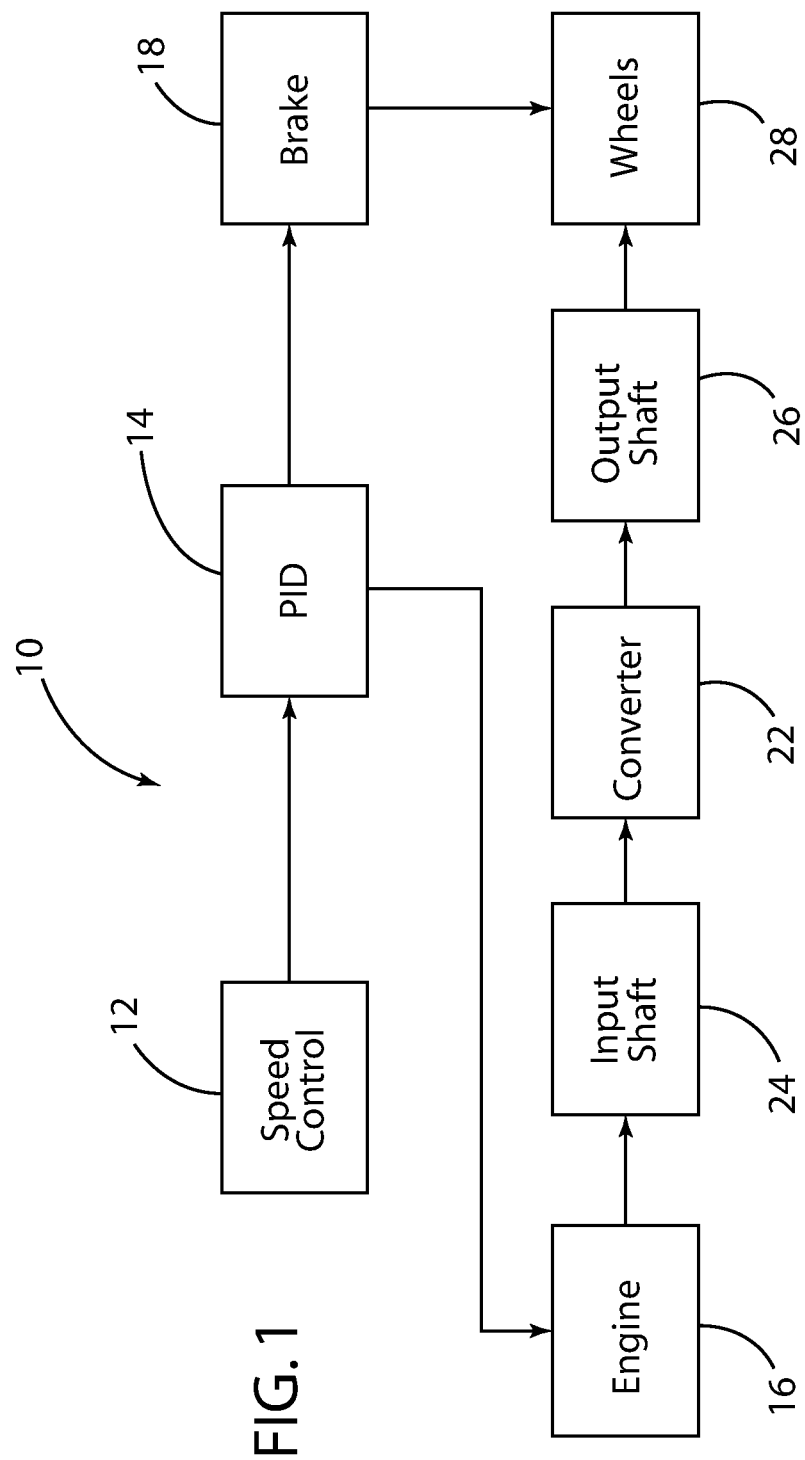
FIG. 1 is a schematic of an embodiment of an apparatus for controlling longitudinal movement of a vehicle.

FIG. 1 schematically illustrates one embodiment of a system and apparatus according to the invention using a vehicle torque model receiving a requested torque command and blending engine and brake torques to deliver a requested torque. The system, seen generally at 10, includes a velocity or speed control unit 12 receiving a requested speed input and setting the vehicle velocity or speed. Wherein the vehicle speed is typically set by the driver or operator of the vehicle or by driver assistance features like adaptive cruise control or assisted parking.

Based on a signal from the speed control unit 12, a controller 14, in the exemplary embodiment the PID controller illustrated in FIGS. 5-7b, determines a requested torque from the velocity or speed control and blends the engine and brake to provide the necessary torque. As shown in FIG. 1 the controller links the engine 16 and the braking system 18, in order to provide the necessary torque to the drive wheels 20.

In FIG. 1 the requested torque of the present embodiment is generated by a hydraulic torque converter 22. The hydraulic torque converter 22 generates output torque based on the speed of an input shaft or drive shaft 24 connected to an impeller of the torque converter 22. The output shaft 26 connected to the torque converter's 22 turbine. The torque converter having a k-factor and torque-ratio data, each dependent on the speed ratio or ratio of turbine speed to impeller speed. The system and apparatus having the necessary parameters needed to calculate the engine speed required for a requested torque at a requested or set vehicle speed. The braking torque can be transmitted directly via braking system 18.

Figure 2:
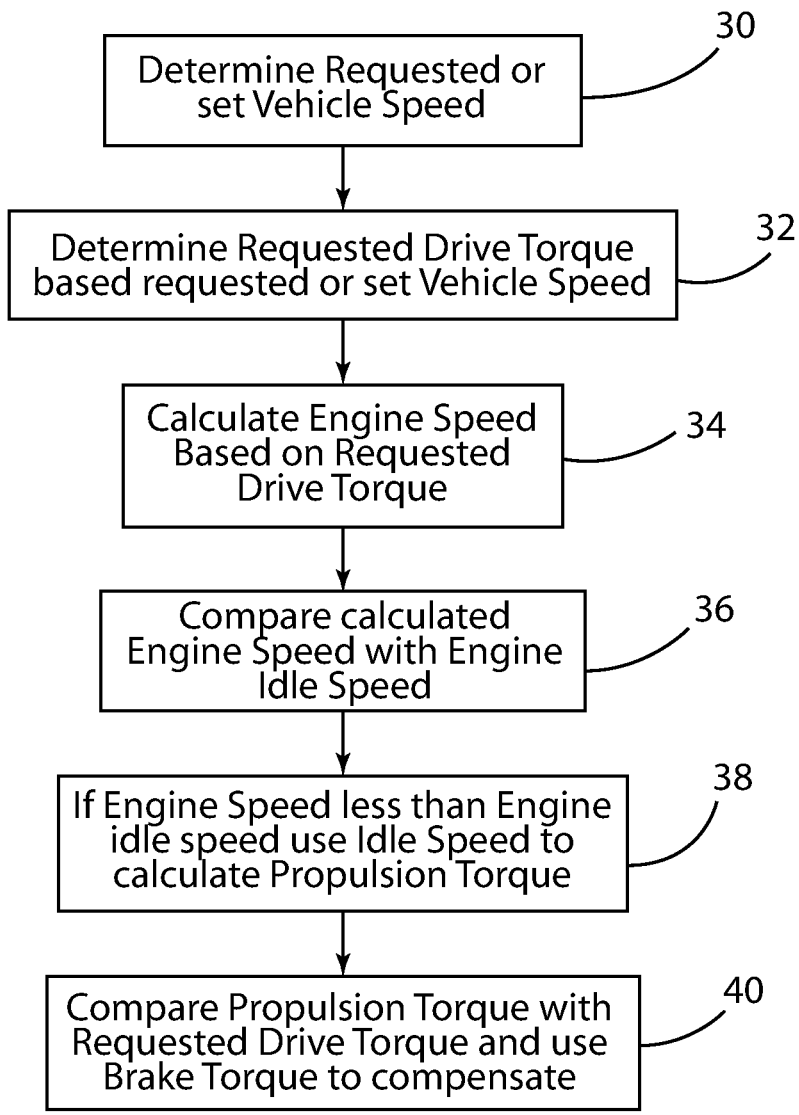
FIG. 2 is a flowchart of an embodiment of a method for controlling longitudinal movement of a vehicle.

A method for ascertaining the requisite engine speed and the requisite braking torque for a given requested torque is illustrated in FIG. 2.

As illustrated in FIG. 2 the method begins with step 30, determining the requested or set vehicle speed. Step 32 determines the drive torque demand based on the requested or set vehicle speed and actual speed. This is basically the controller 14 output. Step 34 calculates the engine speed for the drive torque demand of step 32. Step 36 compares the engine speed with the engine idle speed. In step 38, if the engine speed is less than the idle speed, the idle speed is used to calculate a propulsion torque. Step 40 compares the propulsion torque with the requested torque and if the propulsion torque is greater than the requested torque the system uses the brakes to compensate. Because the propulsion torque at idle speed is low, the aforementioned calculation is made assuming ideal brakes that can apply torque in very fine steps. However, because of brake system inaccuracy, the brake system is limited to application of brake torque at particular or discrete values. For the purpose of illustration, the actual brake torque applied to the drive wheels may have a resolution of 50 N-m.

To overcome the brake system inaccuracy or limitation, at low vehicle or creep speeds the exemplary embodiment utilizes an overlap between the drive torque and the braking torque wherein the engine and the braking system are able to work against one another. The overlap making it possible to implement a fine control via the engine, and a coarser control via the engine and the braking system. This helps reduce jerks from brake system in an attempt to control speed. Thus, the method and system of the exemplary embodiment significantly reduces the number of such coarse actuations for set-point velocity control thus improving overall feel of the velocity control. However, If the vehicle speed set point changes appreciably, the brakes would need to be actuated. Furthermore, at extremely low vehicle speeds shortly before the end stop, the engine speed and brake torque are increased after which engine speed is reduced while the brake torque remains constant to smoothly stop the vehicle without end of stop grab.

In the following, the linkage according to the invention between the engine and the braking system in the course of the provision of the requested output torque will be described in more detail. The overlap torque $M_{overlap}$ is designated as the amount of torque needed to overcome brake torque resolution, that is, the inaccuracy and fine torque application limitations of the braking system causing brake torque application to occur over a range. In general, the overlap torque $M_{overlap}$ is torque range in which the engine and the braking system are able to work against one another and varies with each vehicle and braking system. For example, if a braking system had a 50 N-m resolution or inaccuracy range, in the exemplary embodiment the overlap torque $M_{overlap}$ is 100 N-m. It is implied that this overlap is on top of the torque value that the ideal engine and brake would work against each other with.

Figure 3:
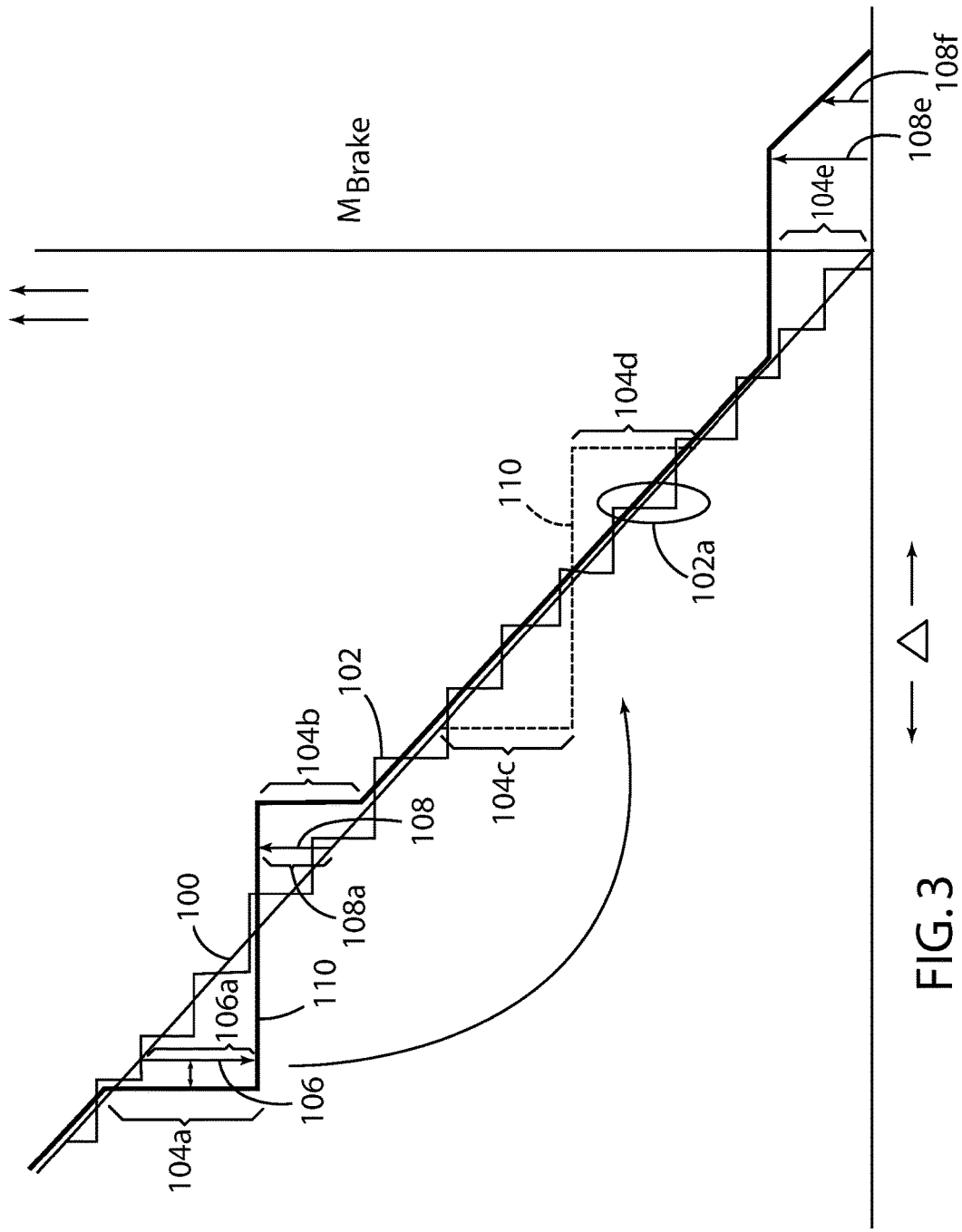
FIG. 3 is a schematic representation of the torque overlap of engine and brakes.

FIG. 3 illustrates an example of overlap torque $M_{overlap}$. Wherein the line 100 illustrates an ideal slope or ratio between the ideal brake request, i.e. the difference ($\Delta$) between the requested output torque ($M_{req}$) from the velocity controller and the torque provided by the engine $M_{engine}$, and the modified brake torque demand $M_{brake}$. Because each brake system has inherent error or brake system inaccuracies, the actual brake response to the ideal request occurs in a stepped fashion as shown in line 102, wherein each step represents an undesirable jerk 102a. To overcome brake system error the disclosed embodiment uses brake torque overlap and engine speed together at low or creep speeds to smoothly control and stop the vehicle. As shown in the overlap regions 104a-104e the brake torque demand $M_{brake}$ remains constant or unchanged 110 over a predetermined range to reduce the amount of brake changes or actuations illustrated in the actual brake response shown in line 102. As illustrated the deviation ($\Delta$), or delta torque, changes to keep the brake torque demand $M_{brake}$ constant or unchanged 110 to reduce the amount of brake changes or actuations. While the number of brake actuations or steps are decreased 102a, the magnitude or value of brake torque at each actuation or step, the overlap 104a-104e, is increased. When operating in a flat region 110, the exemplary embodiment uses the engine speed to compensate for the brake torque mismatch Wherein fine control is via the engine, and coarser control is via the engine and the braking system. As illustrated in FIG. 3, depending upon the position of the constant or unchanged brake torque demand $M_{brake}$ 110 with respect to the ideal slope 100 the engine speed is decreased or increased to compensate for the torque deviation. As illustrated in FIG. 3 the engine speed decreases 106, the engine slows down, based on the magnitude of the brake torque overlap, the distance 106a from the ideal slope 100, to compensate for the brake torque overlap the maximum being 104a. The engine speed increases 108, the engine speeds up, again based on the magnitude or distance 108a from the ideal slope 100, to compensate for the brake torque overlap where maximum being 104b. In a similar fashion, initially, the engine speed increases 108, in an amount 108e to compensate for the brake torque overlap 104e, with the amount of the increase decreasing 108f as the brake torque overlap 104e decreases and approaches a zero point.

The torque demand $M_{brake}$ sent to the braking system in a given case is determined from Table 1. The brake torque demand $M_{brake}$ is based on current values and the deviation ($\Delta$) between the requested output torque ($M_{req}$) from the velocity controller and the torque provided by the engine $M_{engine}$, wherein as set forth below in Table 1, $\Delta = M_{req} - M_{engine}$. In the preceding torque equation, all terms are signed. However, in the following table $M_{brake}$ is unsigned and only can take positive values.

TABLE 1

| | |
|---|---|
| $\Delta = M_{req} - M_{engine}$ | $M_{brake}$ |
| $\Delta \geq 2*M_{overlap}$ | $M_{brake} = 0$ |
| $M_{overlap} \leq \Delta < 2*M_{overlap}$ | $M_{brake} = 2*M_{overlap} - \Delta$ |
| $-M_{overlap} \leq \Delta < M_{overlap}$ | $M_{brake} = M_{overlap}$ |
| $\Delta < -M_{overlap}$ | $M_{brake} = -\Delta$ |

Table 1 illustrates the way brake torque is applied as the vehicle speed setpoint, on flat ground, approaches creep speed from a higher speed. Once the set speed is sufficiently below the creep speed, the overlap works in the following way. As illustrated in FIG. 3 there is a segmented piecewise linear discontinuity in the ideal request 100 to brake torque demand $M_{brake}$ 110 applied to the brake system 18. This helps to reduce some actuations. The deviations in torque, the overlap regions 104a-104e, resulting from are compensated by the engine or engine speed.

For a change of setpoint, so that the overlap is not pushed too far; i.e., needing to drop the engine speed to impossible values or making it too high and increasing fuel consumption, this piecewise linear shape 104a, 110, 104b needs to be shifted, or turned off and reestablished at a new point 104c, 110, 104d. This means there may be big changes needed in the brake torque which can cause jerk. This is mitigated by time based filtering of the brake torque at the moment a shift is needed because the limit of overlap is reached.

On the engine side, to help to complement the brakes, a mechanism is needed to modulate the engine speed based on ideal requested torque. To the requested engine speed a delta speed is requested based on torque deviation (e.g. 106a, 108a). This means the engine might need to go below conventional idle speed or the modified idle speed needs to be slightly higher if the former is not possible.

FIG. 4 illustrates an exemplary embodiment that modulates the engine speed and compensates for the unchanged brake torque 110, wherein the propulsion torque 122 is shown for a given idle speed. The required change in speed calculated from the torque deviation 106a, 108a, or 108e. For example, an engine speed corresponding to the torque deviation needs to be added to or subtracted from the idle speed. As illustrated in FIG. 4, for the purpose of example only, if the brake torque request is 200 N-m at a given vehicle speed 120 and the overlap 104a, 104b is set at 100 N-m the engine speed is used to achieve a brake torque deviation value within the overlap 106a, 108a between 250 N-m and 150 N-m. For example, increasing the engine speed, arrow 126, operates to increase the propulsion torque 122a and correspondingly the vehicle speed and decreasing the engine speed, arrow 128, operates to decrease the propulsion torque 122b and correspondingly the vehicle speed, both occurring while maintaining the brake torque constant 110. It can be recommended to use an idle speed such that going below it doesn't cause any NVH issues or to put it differently use slightly increased idle speed for such scenarios.

FIGS. 5, 6, and 7a-7b illustrate a proportional-integral-derivative controller or PID controller having a control structure to enable launch control and a soft stop and hold. As set forth herein the speed demand or predetermined speed request sent to the controller is limited both as regards the rate of a rise in speed and as regards the rate of a drop in speed. By way of minimal speed, a value of 0.2 km/h, for example, may be allowed. This limit comes from the system's ability to measure speed in this case.

As illustrated in FIG. 5 the P component 70 multiplies the velocity error 72 with a low gain 74 to maintain stability. Ideally, a speed control that uses torque as input quantity should not give rise to an oscillation. However, oscillation is caused by reason of latency periods and delays in actuation, wherein the acceleration exhibits a delay with respect to the requested torque. Consequently, amplification in the course of the proportional control should be chosen to be low.

As illustrated in FIG. 6 the I component 80 is needed, despite the fact that the system has a built in integrator, since external torque disturbances may arise; for example, transmission losses, fluctuations in the coefficient friction of the brake pads etc. The integral control 82 is shut off by making the input to the integrator zero when the velocity error 84 lies within a small tolerance range 86 (for example, ±0.1 km/h), as a result of which oscillations of the speed of the vehicle can be reduced. In the case of a larger control deviation for the speed, a conventional integral component would increase or—depending on the algebraic sign of the control deviation—decrease the controlled output quantity, the torque, too quickly. A fast change in torque would, in turn, result in a rapid change in the acceleration, and consequently in a pronounced jerk response.

In order to make the jerk response independent of the control deviation for the speed, the integral input 88 is not the control deviation for the speed used, instead the integral input is the algebraic sign of the control deviation, multiplied by a suitable amplification factor, chosen reasonably low, as a result of which explicit control of the jerk response is made possible. In that sense the integrator with the input modifications as mentioned make it like a torque ramp up or ramp down request generator to compensate for disturbances.

The limits of the integrator specify how large the requested resultant torque (control output signal) may be. In embodiments of the invention, a restriction may be made to values that correspond to a roadway gradient of around 3-5° (in any direction). Since corresponding pitch oscillations typically also lie within this range, it can be assumed that for full functionality on gradients, to this system, a grade estimator may be added that usually has problems because of bad pitch estimations. A grade estimator however is not proposed in the disclosure.

Figure 7A:
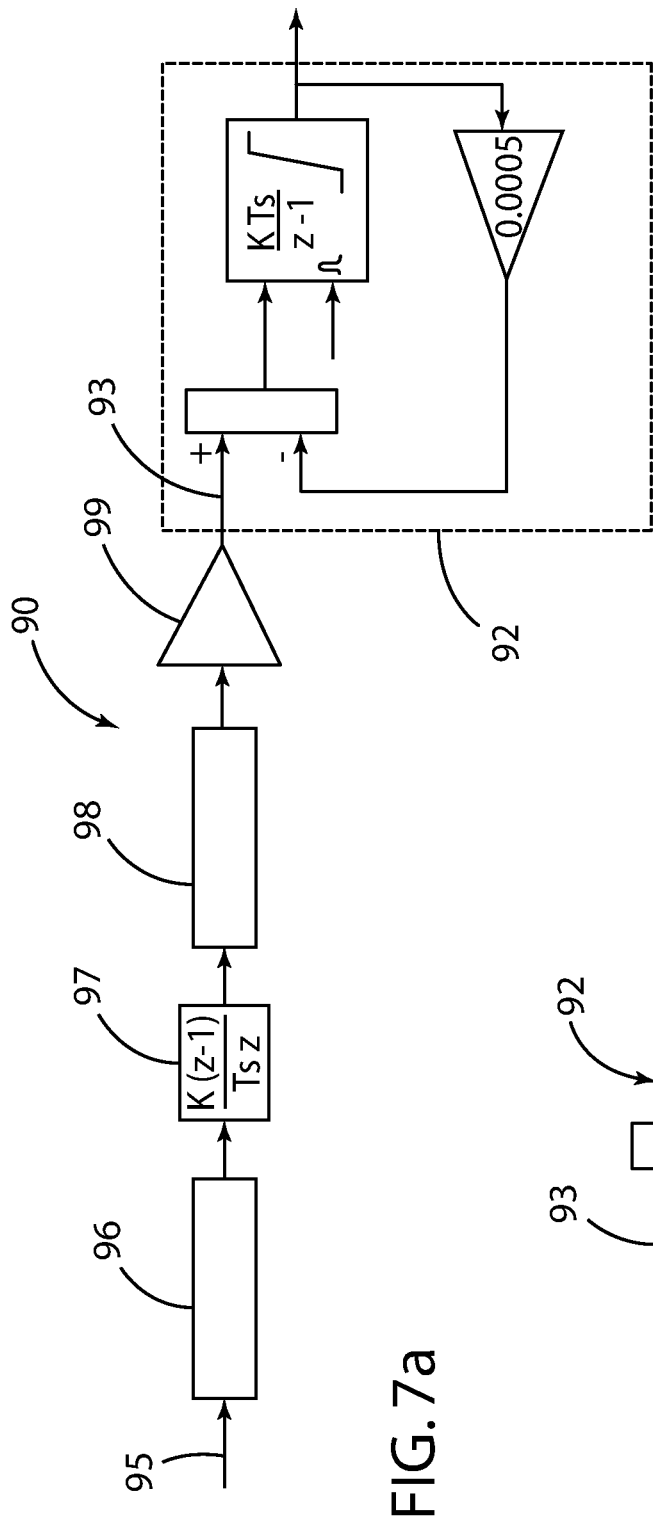
FIGS. 7a and 7b are schematic representations illustrating a D-component, followed by a leaky integrator, of a PID controller according to an exemplary embodiment of the present invention.
Figure 7B:
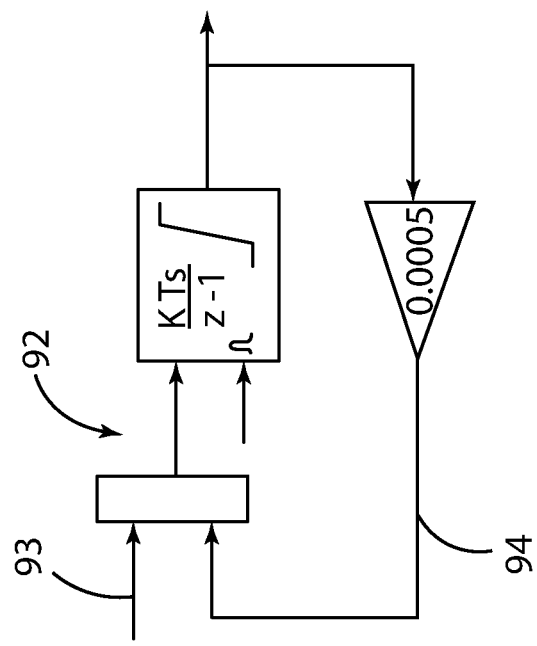

As illustrated in FIGS. 7a-7b, the D component 90 is implemented in such a manner that the derivative of the control deviation is supplied to a leaky integrator 92, i.e. the integrator has a negative feedback signal 94. As shown, the velocity error 95 is input to a low pass filter 96 prior to the derivative function 97, the derivative of the velocity error 95 passes through a low pass filter 98 and gain 99 and is fed 93 into the integrator 92 whereby over time, in the absence of relatively fast changes, the stabilizer integrator 92 slowly goes to zero. A leaky integrator has similar response as a low pass filter. This helps in the following way. If there is a velocity change that results from gradient change for example, the leaky integrator builds up in a way to capture this gradient change so that the P component 70 and I component 80 do not have to work as hard. In other words, they don't have to be tuned aggressively and that's important for smoothness. Over time as the leaky integrator 92 begins to leak slowly, the error shows up slowly at a rate, determined by tuning of the leak gain, that can be made up for by the integrator 80. In this way, it effectively works like one integrator. And that prevents from having oscillations between the two integrators.

The sum of the three components described above, the proportional, integral, and derivative components are supplied to the torque model set forth below.

Figure 8:
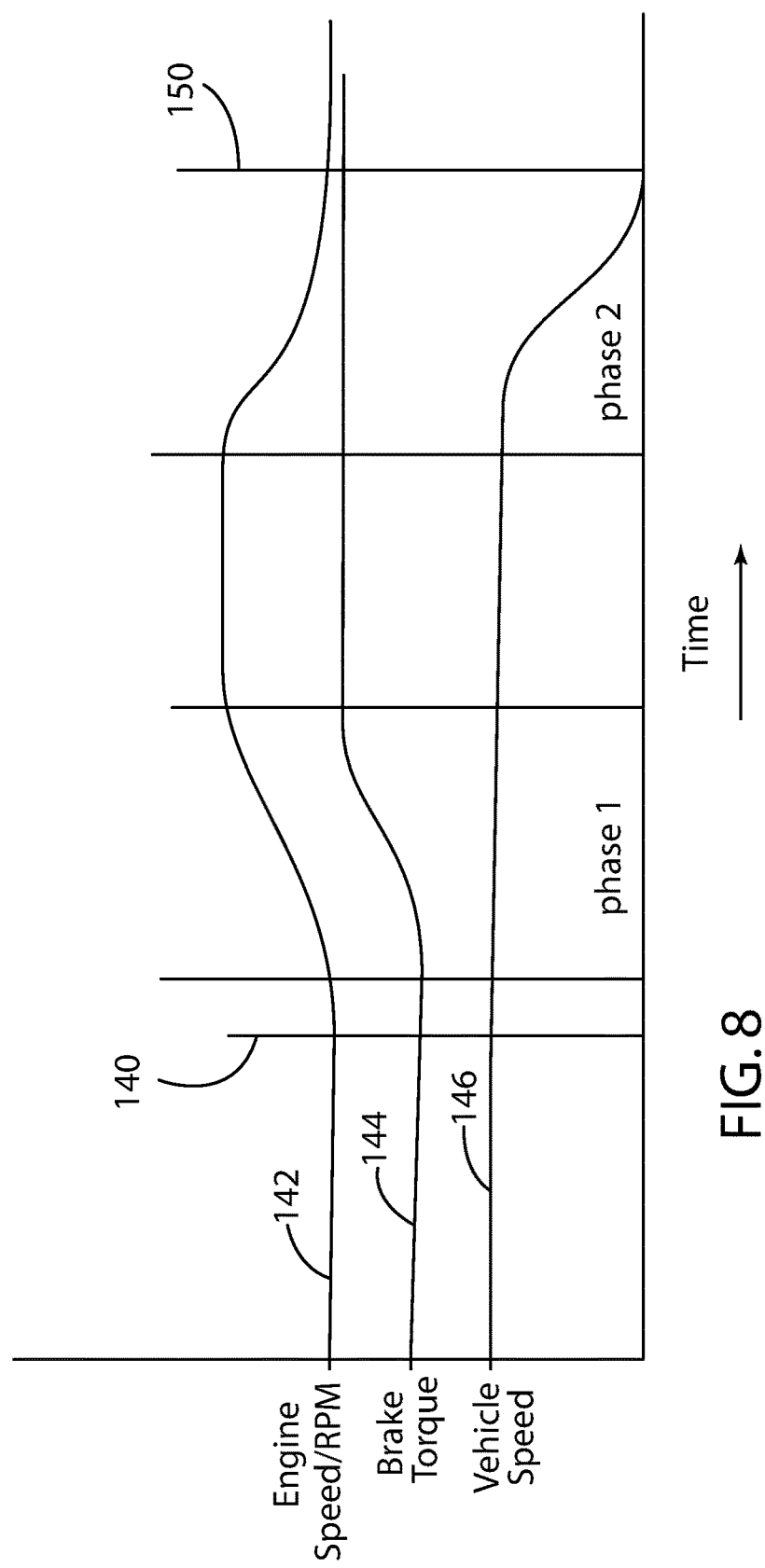
FIG. 8 is a schematic representation of a vehicle stop response according to an exemplary embodiment of the present invention.

For launching from a standstill, a jerk signal is added to the input of the integrator. This signal 89 is supplied to the integrator in the I-component 80 of the controller, summed with the algebraic sign. The logical sequence in the course of the activation and deactivation of the starting control takes place in this case as follows:

If the requested speed exceeds 0.2 km/h and the current speed is lower than 0.1 km/h, a flip-flop is set. The output of this flip-flop is multiplied by a tunable parameter (jerk) and this value 89 is added to the input of the integral term of the control. The signal 89 value is set to 0 once wheel ticks are noticed. The immediate addition of the jerk signal to the integral term ensures that after disappearance of the jerk the controller is again capable of taking over a gentle control since the torque value is correct for just starting to move with negligible acceleration FIG. 8 illustrates an exemplary embodiment of a gentle stop response obtained using the engine. Initially the longitudinal control feature requests a stop, a vehicle speed of zero, at 140. After which, in phase 1, the minimal speed of the engine, or idling speed engine rpm 142, is slowly increased from, for example, a value of 700 revolutions per minute to a value of 900 revolutions per minute. If, by reason of a previous control action and overlap, the engine speed already amounts to more than 900 revolutions per minute, no change occurs, otherwise the engine speed is increased linearly or proportionally with time.

The increased engine speed, or engine rpm 142, corresponds to a higher drive torque. That means that the drive torque, which has been increased by reason of the increased engine speed, must be compensated by the braking system providing an increased brake torque 142 in accordance with the relationship shown in phase 1 of FIG. 8. As shown, the vehicle velocity or speed 146 remains constant.

After completion of phase 1, described above, phase 2, the second phase, takes place when the vehicle speed lies below 0.3 km/h and the requested speed, set speed value, amounts to zero. In this case, the engine speed 142 is slowly lowered by 200 revolutions per minute. This takes place outside the torque model. Since the engine speed reduction occurs outside of the torque model set forth previously, no change in the requested brake torque 144 occurs. In phase 1 it was already ensured that the propulsion torque and the brake torque are balanced, so that in the course of the decrease in phase 2 the constant brake pressure is high enough, such that as the engine speed 142 reduction occurs in phase 2, the vehicle speed or velocity 146 correspondingly reduces the vehicle speed 146 until the vehicle is brought to a stop at 150 at the end of phase 2. The brake torque 144 high enough to stop the vehicle but low enough to ensure jerk-free stopping. In conventional brake stops, most of the jerk is what is known as the end of stop brake grab. This is almost completely eliminated by virtue of stopping by reducing engine speed while holding brake torque constant.

In keep the vehicle stationary, the integrators, that have reasonable values to secure a vehicle at stop, are reset if the speed demand amounts to zero and the actual vehicle speed lies below 0.1 km/h, minimum measurable speed 0.2 kph in this case, for a period of 5 seconds. This serves as confirmation that the vehicle has been stopped. A change in the set speed value by more than 0.2 km/h concludes resetting of the integrator and a restart takes place. Even if the vehicle goes through some gentle stop phase and the stop demand is withdrawn, corresponding to a set speed value of more than 0.2 km/h, the engine-speed modifications from phase 1 and/or phase 2 are annulled, which may occur at a substantially higher rate.

As a result, an extremely jerk-free handling response can be achieved with the method according to the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for longitudinal control of a motor vehicle comprising:
   determining a drive torque based on a set vehicle speed and actual speed;
   calculating an engine speed from said drive torque;
   using the higher of the calculated engine speed and an engine idle speed to determine a propulsion torque;
   comparing said propulsion torque with said drive torque; and
   applying a brake torque to compensate for the difference in said drive torque and said propulsion torque when said propulsion torque is greater than said drive torque.

2. The method of claim 1 including changing said idle speed to change said propulsion torque while maintaining said brake torque at a constant value.

3. The method of claim 1 wherein said brake torque is independent of and does not vary with respect to a change in said engine idle speed.

4. The method of claim 1 wherein the method is performed by a PID controller controlling vehicle speed, said controller having an integral component; and
   deactivating the integral control if a deviation of the vehicle speed lies within a predetermined tolerance range.

5. The method of claim 4 wherein if the deviation of the vehicle speed lies outside a predetermined tolerance range, the algebraic sign of the deviation, multiplied by an amplification factor, is integrated in the integral component of the PID controller.

6. The method of claim 5 wherein in the differential component of the PID controller the derivative of the deviation is supplied to an integrator, minus a feedback amplification signal of the integrator.

7. A method for longitudinal control of a motor vehicle comprising:
   determining a requested output torque based on a set vehicle velocity;
   using an engine idle speed to determine a propulsion torque;
   determining a delta torque from said requested output torque and said propulsion torque;
   establishing an overlap torque;
   using said overlap torque and said delta torque to determine a brake torque demand; and
   applying said brake torque demand to a brake system to control vehicle longitudinal movement.

8. The method of claim 7 wherein the method is performed by a PID controller to control vehicle velocity, said controller having an integral component; and
   deactivating the integral component if a control deviation of the vehicle velocity lies within a predetermined tolerance range.

9. The method of claim 8 wherein if the value of the deviation of the vehicle velocity lies outside a predetermined tolerance range, the algebraic sign of the deviation, multiplied by an amplification factor, is integrated in the integral component of the PID controller.

10. The method of claim 9 wherein in the differential component of the PID controller the derivative of the deviation is supplied to an integrator, minus a feedback amplification signal of the integrator.

* * * * *